US010513205B2

(12) United States Patent
Nasiri

(10) Patent No.: US 10,513,205 B2
(45) Date of Patent: Dec. 24, 2019

(54) PASSENGER COMPARTMENT FOR COMMERCIAL PASSENGER TRANSPORTATION VEHICLES

(71) Applicant: Asghar Nasiri, Qaen (IR)

(72) Inventor: Asghar Nasiri, Qaen (IR)

( * ) Notice: Subject to any disclaimer, the term of this patent is extended or adjusted under 35 U.S.C. 154(b) by 0 days.

(21) Appl. No.: 15/797,205

(22) Filed: Oct. 30, 2017

(65) Prior Publication Data
US 2018/0056846 A1    Mar. 1, 2018

Related U.S. Application Data

(63) Continuation of application No. PCT/IB2016/051921, filed on Apr. 5, 2016.

(51) Int. Cl.
*B60N 2/34* (2006.01)
*B60N 2/24* (2006.01)
*B60P 3/39* (2006.01)
*B61D 1/08* (2006.01)
*B60N 3/00* (2006.01)
*B60N 2/01* (2006.01)
*B60N 2/90* (2018.01)

(52) U.S. Cl.
CPC ............ *B60N 2/242* (2013.01); *B60N 2/01* (2013.01); *B60N 2/345* (2013.01); *B60N 2/995* (2018.02); *B60N 3/001* (2013.01); *B60P 3/39* (2013.01); *B61D 1/08* (2013.01)

(58) Field of Classification Search
CPC ............ B60N 2/242; B60N 2/01; B61D 1/08
USPC ....... 296/178; 244/118.6; 105/314–316, 322, 105/323, 326
See application file for complete search history.

(56) References Cited

U.S. PATENT DOCUMENTS 2,364,595 A * 12/1944 Tully ............... B61D 1/08
                                                    105/315
4,582,354 A *  4/1986 Halim ............. B60N 2/242
                                                    105/344
4,964,671 A    10/1990 Millar
6,126,218 A    10/2000 Karhumaki
(Continued)

FOREIGN PATENT DOCUMENTS

CN         2061136        8/1990
CN         2677244        2/2005
(Continued)

OTHER PUBLICATIONS

PCT/IB2016/051921 Written Opinion of the International Searching Authority dated Jan. 10, 2017.
(Continued)

*Primary Examiner* — Dennis H Pedder
(74) *Attorney, Agent, or Firm* — NovoTechIP International PLLC

(57)    ABSTRACT

A passenger compartment for commercial passenger transportation vehicles is provided. The passenger compartment includes multiple twin cabins, each twin cabin including two passenger cabins. The two passenger cabins including a first cabin and a second cabin identical to the first cabin. The second cabin is installed on top of the first cabin such that the second cabin is shifted towards front of the first cabin as much as half the length of the first cabin. Each of the first and the second cabin includes at least one passenger seat, and the passenger seat converts to a bed.

21 Claims, 24 Drawing Sheets

(56) References Cited

U.S. PATENT DOCUMENTS

| | | | |
|---|---|---|---|
| 7,798,446 B2* | 9/2010 | Park | B60N 2/34 244/118.5 |
| 9,604,724 B2* | 3/2017 | Savard | B64D 11/06 |
| 2002/0033432 A1* | 3/2002 | Mikosza | B64D 11/0601 244/118.6 |
| 2003/0019976 A1* | 1/2003 | Cheung | B64D 11/00 244/118.5 |
| 2004/0012235 A1* | 1/2004 | Freller | B60N 2/24 297/232 |
| 2006/0000947 A1* | 1/2006 | Jacob | B64D 11/00 244/118.6 |
| 2016/0052631 A1* | 2/2016 | Lin | B64D 11/00 244/118.6 |

FOREIGN PATENT DOCUMENTS

| | | |
|---|---|---|
| CN | 101234641 A | 8/2008 |
| CN | 103693051 | 4/2014 |
| DE | 202004015054 | 11/2004 |

OTHER PUBLICATIONS

International Search Report dated Jan. 10, 2017 from International Patent Application No. PCT/IB2016/051921.

* cited by examiner

801

PASSENGER COMPARTMENT FOR COMMERCIAL PASSENGER TRANSPORTATION VEHICLES

CROSS-REFERENCE TO RELATED APPLICATIONS

This application is a Continuation of International patent application PCT/IB2016/051921, filed on Apr. 5, 2016, the disclosure of which is incorporated by reference in its entirety.

TECHNICAL FIELD

The present application relates generally to passenger compartment arrangement and model for transportation vehicles and, more particularly, to a passenger compartment having a cabin which includes a seat/bed for each passenger while the total capacity of the vehicle is remained at the standard level.

BACKGROUND

A public transportation vehicle generally includes an engine, a suspension system and chassis and a body which includes a passenger compartment. The manufacturers of passenger compartments for the public transportation vehicles typically design and build the compartments based on a known common standard design as seen in buses, trains and passenger airplanes which are currently in use.

For example, buses may have different classes based on their length, number of axles, number of stories or decks (e.g., double-decker buses), and having pivoting joints (e.g., articulated buses). Various bus classes include, single-decker, 2 axles, 12.5 meters long buses; single-decker or double-decker, 3 axles, 15 meters long buses; single-decker, 3 axles, 18 meters long articulated buses (typically used for urban transportation); and single-decker, 4 axles, 25 meters long articulated buses (typically used for urban transportation).

In addition, various standards are applied on manufacturing buses for example the maximum height of 4 meters, and maximum width of 2.6 meters which may not be violated. Some other less strict restrictions include maximum net and gross weights of the vehicle, maximum weight on each axle, minimum engine power and maximum length of the vehicle.

The two axle buses may have a maximum length of 12.5 meters. The weight of recent two axle buses is 18 to 19 tons which includes 4 tons for total weight of passengers and cargo. The engine power of these buses is usually 420 horsepower while their older generation had 260 horsepower and 16 tons maximum weight.

Double-decker buses should have three axles because the total weight of the vehicle is drastically higher than single-deckers and reaches to 27 tons. The length of the double-deckers may also increase by 15 meters. However, the number and popularity of this type of bus is decreasing.

The most common buses in the world are single-decker buses which mostly have two axles and some have three axles. For longer buses with lengths around 18 to 25 meters the number of axles need to be increased and for lengths above 15 meters articulating joints need to be added. Due to accessibility and lower cost, buses are still one of the most common transportation means in the world. However, passenger comfort during bus travels has not received as much attention as other transportation vehicles such as trains or airplanes have received. For example, buses typically lack sleep facilities such as flat beds.

In recent years commonly used buses have been equipped with facilities, some above expectation, such as close to perfect air conditioning, heat, seamless double pane windows, comfortable seats, pleasant environment, higher safety features, and various other features for passenger and driver comfort. However, in long distance travels the above features do not sufficiently provide passenger comfort.

The current bus compartment arrangements cause discomfort to passengers in long distance trips. After about an hour of sitting still in a limited space without moving the body starts to get tired and painful and as a result this tiredness may cause short term and sometimes long term physical and mental distress to the passenger. The narrow space between the seats does not allow the passenger to move and enjoy the trip. For this reason, people may be reluctant to travel by bus unless they have no other travel means available to them.

Some efforts for manufacturing more comfortable bus compartments have led to manufacturing of ceremonial buses which include beds and other furniture. However, such vehicles have very low capacity and can hold at most a handful of people such as members of a family and therefore are not suitable for commercial use. Some other bus compartments include only beds in two or three decks or half the compartment includes seats and the other half includes beds. These bus compartments, however, still have limited capacity for commercial transportation and therefore have not attracted interest.

Yet, other types of buses having beds have been manufactured which include narrow beds in two or three decks where there are no cabins separating beds and no privacy is provided. In recent years bus compartments similar to train compartments have been introduced where the central hallway is omitted and therefore no contact between bus driver and passengers exist. This compartment includes five cabins each having 8 passenger capacity where each cabin has a folding door and the cargo is place at the end of the bus. In addition, various VIP buses are introduced which are similar to ordinary busses with more space between seats and as a result lower capacity. The VIP buses include classes 32 passenger buses and special 24 passenger buses having a foot rest for each passenger.

Efforts for providing a more comfortable bus compartment may include manufacturing double-decker buses. However, manufacturing cost and maintenance cost of a double-decker bus may increase by 50 percent compared to the single-decker busses. In addition, increased height of double-decker buses and lower heights of the hallways inside these buses may cause limitations. For these reasons double-decker buses are not popular. Long buses with lengths higher than the regular 12.5 meters may need extra axles and to be articulated and these additional features may cause increase in manufacturing costs. Moreover, various technical issues such as turning in narrow roads decrease popularity of such buses.

VIP buses have recently attracted attention. The VIP buses have the same length as the ordinary 12.5 meter long buses with half or a third of the capacity of ordinary buses. The reduced capacity causes increase in passenger fees and ticket prices. Classis VIP busses include 34 seats and no beds. The seats provide more comfort than ordinary buses with each row having 3 seats two on one side and one on the other side. Special VIP buses include 22 to 26 seats, which is almost half the capacity of an ordinary bus. However, amidst the reduced capacity no beds are provided in special VIP buses. Each seat has a foot rest and can be reclined to provide a resting position for the passenger. However, the passenger cannot turn on the seat and the reclined seat may cause distress to other passengers in the behind.

The foregoing issues are not limited to buses and exits in other forms for transportations. For example, airplanes are typically designed with cylinder shapes. The airplane bodies may have geometric shapes such as oval egg shapes. Components and compartments of the airplane can be affected by the oval shape. For example, doors, windows, ceiling and floor may be semi-circular, narrow and caved. Since the airplane floor is in the shape of a half oval, the passenger seats may be curved backward and passenger leg positions may be inconvenient. The cylinders are in the full package like a puzzle. Various features can be introduced to save space for passenger convenience. In current airplane designs due to the cylinder shape of the airplane seats are inconvenient, entering and exiting the seats is hard, a passenger is not able to stand upright above their seat, and other issues and problems also arise from the cylinder shape of the airplane body.

Some other issues with currently used public transportation vehicles include lack of storage boxes, lack of monitors or small and not-fixed monitors behind the front seat which move with reclining of the front seat and restriction of sounds to earphones due to lack of separate and private cabins for each passenger.

Hence, a need exist for transportation vehicles (e.g., buses) providing more comfort and more space for passengers without reducing the total capacity of the transportation vehicles.

SUMMARY

In one general aspect, the instant application describes a twin passenger compartment for a commercial vehicle that includes a first cabin including a first seat for a first passenger, a first podium placed in front of the first seat and configured to provide a resting space for the first passenger's feet when the first passenger is in a sleeping position, and a first empty space placed between the first podium and the first seat configured to provide a resting space for the first passenger's feet when the first passenger is in a seating position. The twin passenger compartment for the commercial vehicle also includes a second cabin installed on top of the first cabin such that the second cabin is accessible from the first cabin and is shifted toward front end of the first cabin as much as approximately half length of the first cabin, the second cabin includes a second seat for a second passenger, a second podium placed in front of the second seat and configured to provide a resting space for the second passenger's feet when the second passenger is in a sleeping position, and a second empty space placed between the second podium and the second seat configured to provide a resting space for the second passenger's feet when the second passenger is in a seating position. The twin passenger compartment also includes a first filling element configured to be placed between the first seat and the first podium to connect the first seat to the first podium and provide a first bed rest area in the first cabin; and a second filling element configured to be placed between the second seat and the second podium to connect the second seat to the second podium and provide a second bed rest area in the second cabin. The first cabin includes a recess located above the first seat. The recess extends inwardly from an outside edge of the first seat toward an inside of the first cabin for approximately 10 to 15 centimeters to provide an extra space for a torso of a passenger walking in a hallway of the commercial vehicle. The second seat rests on the roof of the first cabin such that substantially an entire area under the second seat falls within an interior space of the first cabin.

The above general aspect may include one or more of the following features. Each of the first and second cabins may be approximately two meters long, one meter wide and one and half meters high. The twin passenger compartment may be approximately three meters long, one meter wide and between two to two and half meters high. The distance between the first seat with a first cabin wall located in front of the first seat may be approximately 150 centimeters. The distance between the second seat with a second cabin wall located in front of the second seat may be approximately 150 centimeters.

The first seat may include a first horizontal portion configured to provide a resting place for a bottom of the first passenger, a first vertical portion configured to provide a resting place for a back of the first passenger, and a first railing placed below the first horizontal portion. The second seat may include a second horizontal portion configured to provide a resting place for a bottom of the second passenger, a second vertical portion configured to provide a resting place for back of the second passenger, and a second railing placed below the second horizontal portion. The first railing may be configured to move the first horizontal portion forward such that the first horizontal portion is moved to fill the first empty space. The second railing may be configured to move the second horizontal portion forward such that the second horizontal portion is moved to fill the second empty space.

The first vertical portion may be configured to move forward as the first horizontal portion moves forward to replace an original position of the first horizontal portion prior to moving forward. The second vertical portion may be configured to move forward as the second horizontal portion moves forward to replace an original position of the second horizontal portion prior to moving forward.

The first vertical portion may be configured to remain stationary as the first horizontal portion moves forward. The second vertical portion may be configured to remain stationary as the second horizontal portion moves forward. The first podium may include a first railing section configured to extend outwardly to fill in the first empty space and turn the first cabin to a bed. The second podium may include a second railing section configured to extend outwardly to fill in the second empty space and turn the second cabin to a bed.

A lower part of the second cabin may merge into an upper part of the first cabin such that a total of the twin cabin is between approximately two to two and half meters high. A space under the first podium may be provided for additional leg room in the first cabin. Similarly, a space under the second podium may be provided for additional leg room in the second cabin.

The first and second empty spaces may be each approximately 50 centimeters long. The first and second podiums may be each approximately one meter long and one meter wide, with a height substantially equal to a height of their respective seats. The first filler may be a first table placed within the first empty space and includes an adjustable leg to move between a first position and a second position, wherein at the first position the first table is configured to provide a working space or an eating space for the first passenger and at the second position the first table is configured to be placed between the first seat and the first podium to connect the first seat to the first podium and provide the first bed rest area in the first cabin, and the second filler may be a second table placed within the second empty space and includes an adjustable leg to move between a first position and a second position, wherein at the first position the second table is configured to provide a working space or an eating space for the second passenger and at the second position the second table is configured to be placed between the second seat and the second podium to connect the second seat to the second podium and provide the second bed rest area in the second cabin.

The first filler may be further configured to form a first backing portion of the first seat. The second filler may be further configured to form a second backing portion of the second seat. The first podium may include a first railed shelf configured to slide over the first podium, when pulled by the first passenger, slide over the first empty space and become the first filler for filling the first empty space. The second podium may include a second railed shelf configured to slide over the second podium, when pulled by the second passenger, slide over the second empty space and become the second filler for filling the second empty space.

The first and second fillers may include detachable fillers configured to be detached and stored in a storage within the first and second cabins respectively. The first passenger seat may include a two piece seat back, wherein the first passenger seat slides forward to function as the first filler for filling the first empty space and completing the first bed area while the seat back reclines backwards and a lower piece of the seat back provides a top part of the first bed area. The second passenger seat may include a two piece seat back, wherein the second passenger seat slides forward to function as the second filler for filling the second empty space and completing the second bed area while the seat back reclines backwards and a lower piece of the seat back provides a top part of the second bed area.

The first podium may include a horizontal piece and a vertical piece. The horizontal piece being in a same plane as the first seat and configured to move forward to function as the first filler and the vertical piece being a plane perpendicular to the plane of the first seat and configured to move forward along with the horizontal piece to fill a space created at an end of the first cabin when the horizontal piece is moved forward by the first passenger, thereby becoming in the same plane as the first seat. The second podium may include a horizontal piece and a vertical piece, the horizontal piece being in a same plane as the second seat and configured to move forward to function as the second filler and the vertical piece being a plane perpendicular to the plane of the second seat and configured to move forward along with the horizontal piece to fill a space created at an end of the second cabin when the horizontal piece is moved forward by the second passenger, thereby becoming in the same plane as the first seat.

Each of the first cabin and the second cabin may include four passenger capacity or two passenger capacity. Each of the first cabin and the second cabin may have a display monitor. The second cabin is accessed via a stairway or a ladder placed inside the first cabin. The commercial vehicle may include a bus and the bus includes a plurality of the two passenger compartments. The bus may include at least five twin passenger compartments on a driver's side and at least five twin passenger compartments on a co-driver's side. A hallway may be located between the twin passenger compartments on the driver's side and the twin passenger compartments on the co-driver's side. A width of the hallway may be configured such that the width is wider at a shoulder length of a person walking in the hallway and narrower at above and below the shoulder length. The narrower hallway may add to a width of the plurality of twin cabins on two sides of the hallway.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

Figure 1:
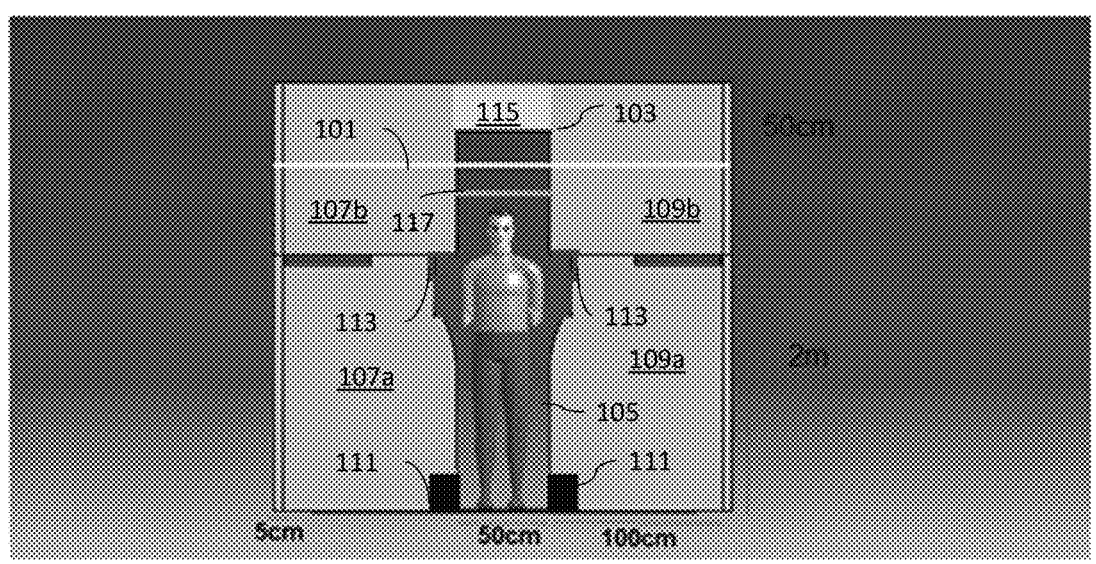
FIG. 1 illustrates a view of a central hallway of a passenger compartment, according to an embodiment.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Ordinary two axle buses having a length of 12.5 meters may have at least a total capacity of 38 passenger seats. This capacity may be increased up to 42 seats with different seat arrangements. In some cases, by adding a row of 5 non-reclining seats on the engine bump at the end of the bus the total capacity increases to 44 passenger seats. As previously discussed, the tow axle buses may be at most 12 to 12.5 meters long. The common ordinary buses may have 11 rows of two passenger seats behind the driver seat and 9 rows of the two passenger seats on the opposite side. Therefore there may be an average of 10 rows of seat on both sides of the walkway in the middle of the bus.

The first 1.5 meters of the bus length in front of the bus is typically occupied by driver seat, co-driver seat and the front entrance. In addition, about one square meters of the bus space (about one meter of the length) on the co-driver side may be assigned to the back exit, water cooler and refrigerator. As a result, around 2 to 2.5 meters of the bus length cannot be used for sitting arrangements and only about 10 meters may remain for this purpose. This space therefore needs to be used for highest possible passenger seat capacity and highest possible provided comfort.

Buses typically have a width of at most 2.6 meters. Around 10 centimeters of the bus width is the width of walls. The windows can have lower width of around 2 centimeters and the remainder of the 10 centimeter width under the windows can be used for passenger seat arm rest. In addition, each passenger seat can be 50 centimeters wide such that the four passenger seats in a row may have a total width of 2 meters and the remaining 50 centimeters is used for the hallway in the middle of the bus.

The height of a single-decker bus can be at most 4 meters including the air conditioning equipment installed on the roof. New buses have a total height of 3.85 meters. The disclosed model may also have a height of 3.85 meters, while the height of the internal compartment can be increased from 2 meters in the ordinary buses to 2.5 meters in the disclosed model. In addition, the voluminous equipment and the connected top shelves above the passenger seats can be omitted. The disclosed model can be implemented in a compartment with a height between 2 and 2.5 meters.

The disclosed model can be implemented in passenger vehicles other than buses such as, for example, trains and airplanes. A train car may typically have a height of 2.8 meters which is 30 centimeters more than height of the disclosed model. The train cars may have high curvature ceilings with shorter walls or low curvature ceilings with taller walls. The second type of train cars with taller walls may be more suitable for implementation of the disclosed model.

The bus compartments may be placed immediately on top of the fender, such that the compartment floor is immediately above the fender. In some buses a mesh layer with a thickness of 30 to 50 centimeters may be placed on the chassis and below the compartment to put the compartment to a higher level. The mesh can prevent protrusion of the engine bump on the compartment floor.

In some embodiments of the present disclosure, the bus compartment can be placed immediately on top of the fender and the only protrusion on the compartment floor can be the engine in 1.5 meters of the length of the compartment on the back side. In some other instances, the compartment floor can be up to 25 centimeters lower than the ordinary buses such that the fenders can be fixed in boxes devised within passenger cabins discussed hereinafter.

In ordinary buses, height of the hallway ceiling can be 2 meters throughout the compartment. However, the luggage shelves placed above the seats and the air conditioning ducts on the ceiling may reduce the ceiling height such that the passengers may need to bend their head when standing up from the seat. In one embodiments, the luggage shelves and air conditioning ducts can be removed from the compartment ceiling such that the ceiling height throughout the compartment is maintained at 2.5 meters or the ceiling height can be adjustable from 2 to 2.5 meters.

In some embodiments, passenger cabins can be devised within the bus compartment such that the total passenger capacity of the bus is maintained. The passenger cabins may include foundations and skeletons devised in the compartment and then completed using other material. For example, 20 to 22 passenger cabins may be devised within the compartment. Passenger cabins may be devised on both sides of the hallway and a cabin may have a gross length of 2 meters in the direction of compartment length. The net length of the passenger cabin can be as long as the average height of a tall passenger such that the passenger can lie down in a bed devised inside the cabin. The width of a cabin can be as wide as two seats and the foot rest space can be 50 centimeters.

In ordinary buses, a seat can be reclined backwards and in VIP buses the reclining degree is even higher than ordinary buses to enable the passenger to sleep. In one embodiment of the present disclosure, the passenger seat back can be perpendicular to the floor and the passenger cabin may have a fixed vertical back wall such that no reclining feature into the space behind the cabin can be provided. In this embodiment, a feature can be devised to enable the passenger to recline the seat, for example, by moving the seat forward and reclining the seat within the passenger cabin space. For example, the seat may be installed on a railing such that the seat can slide forward on the railing and then recline. In addition, a feature can be provided for the passenger seat to convert to a bed for the passenger to lie down. However, known ordinary or VIP buses cannot provide the railing feature of the seat because the railing may require extra space for each seat which in return reduces the capacity of the bus.

In some embodiment, in an ordinary full capacity bus passenger cabins can be provided while the capacity of the bus is maintained at maximum capacity of its class, for example, two double passenger cabins can be installed on two sides of the hallway. In some other embodiments, in a VIP bus, cabins can be provided such that double passenger cabins are installed on one side of the hallway and other side of the hallway is devised with single passenger cabins. In yet other embodiments, in a special VIP bus single passenger cabins can be devised throughout the bus compartment. The passenger cabins as discussed can provide comfort and relaxation for the passengers and an environment for enjoying sceneries, entertainment, dining, studying, making phone calls, sleeping and working.

In an ordinary bus with passenger cabins, according to one embodiment, 22 passenger cabins can be arranged within the net space of the bus compartment with 10 meters length. Twin passenger cabins can be designed such that two cabins can fit into each other similar to pieces of a puzzle. As a result, the length of a twin cabin can reduce to 2 meters from 4 meters a total length of two cabins located linearly. In this embodiment, the cabin length can be maintained at 2 meters and the height of each twin cabin can be also maintained at a minimum level. The cabin heights can be 2 or 2.5 meters which does not affect the bus capacity. However, the width of each cabin, bed, or seat and the hallway width may depend on the class of the bus (ordinary, VIP, or special VIP) and may affect the comfort provided to the passenger. The capacity of an ordinary bus with cabins can be 44 passengers, the capacity of a VIP bus with cabins can be 34 passengers, and the capacity of a special VIP bus with cabins can be 24 to 26 passengers. Maintaining the bus capacities at the level similar to existing buses enable the transportation providers to offer highly comfortable travel to passengers while the fees can be maintained at the current level.

Such cabin walls can be built using light and thin material because these structures are not bearing high loads. Other load bearing structures can be built using the same material used in current buses. In addition the floor and the ceiling of the compartment can be built based on the same structures currently used in the floor and ceiling of current buses.

FIG. 1 illustrates a view of a central hallway of a passenger compartment, according to one embodiment. As shown in FIG. 1, line 101 illustrates the ceiling height of the compartment in current buses. The present disclosure can increase the ceiling height by 50 centimeters to the level shown as 103. The compartment of FIG. 1 is single-decker with a central hallway 105 and two rows of twin cabins 107a and 107b and 109a and 109b placed on two sides of the central hallway. In the lower part of the hallway, the two squares 111 can be added to the hallway space from the bottom part of the cabins 107a and 109a. The dent shaped corners 113 on two sides of the hallway 105 can provide more space for the hallway and more comfort for a person walking in the hallway 105. The area 115 below the compartment ceiling is a 20 to 30 centimeters deep box that can be used as an air conditioning duct to guide the air into the cabins 107b and 109b.

The area 115 may also be used as a storage box accessible by passengers in cabins 107b or 109b. The part shown as line 117 can be an arm rest for cabins 107b and 109b. For example the arm rest may be a one piece sheet having the total length of the compartment and a width slightly narrower than the hallway 105. The arm rest 117 can be placed 40 centimeter higher than the seat level of cabins 107b and 109b. Passengers sitting next to the hallway 105 in cabins 107b or 109b can rest their arm on the arm rest or, for example, use the arm rest for writing, etc. The passenger of cabins 107b and 109b having access to arm rest 117 may not feel the cabin's high elevation from the compartment floor. The arm rest 117 may have a folding or sliding feature to be folded to a narrower width when an arm rest is not needed and be unfolded or sliding open by a passenger when needed. The arm rest 117 can be made from transparent or mate material or have a railing structure.

In some instances, in a VIP bus or in a train compartment the central hallway may not be needed and can be omitted. The cabins 107a, 107b, 109a, and 109b can have sliding doors to provide privacy to the passengers. In some embodiments, the cabins may be kept open or half open. In an ordinary bus with full capacity, the hallway 105 may be about 50 centimeters wide. However, in such buses the open space above passenger seats provides added space to the narrow hallway 105. In the disclosed model, the closed cabins on both side of the hallway 105 may cause the narrow hallway to be a confined space without any extensions of space. The dents 113 having a width around 10 to 15 centimeters provided from the space under the passenger seats of cabins 107b and 109b and from the curvature of the back of the passenger seat in cabins 107a and 109a can add 20 to 30 centimeters of width to the hallway 105. In this manner, an extra space for the torso of a person walking in the hallway 105 may be provided.

Figure 2:
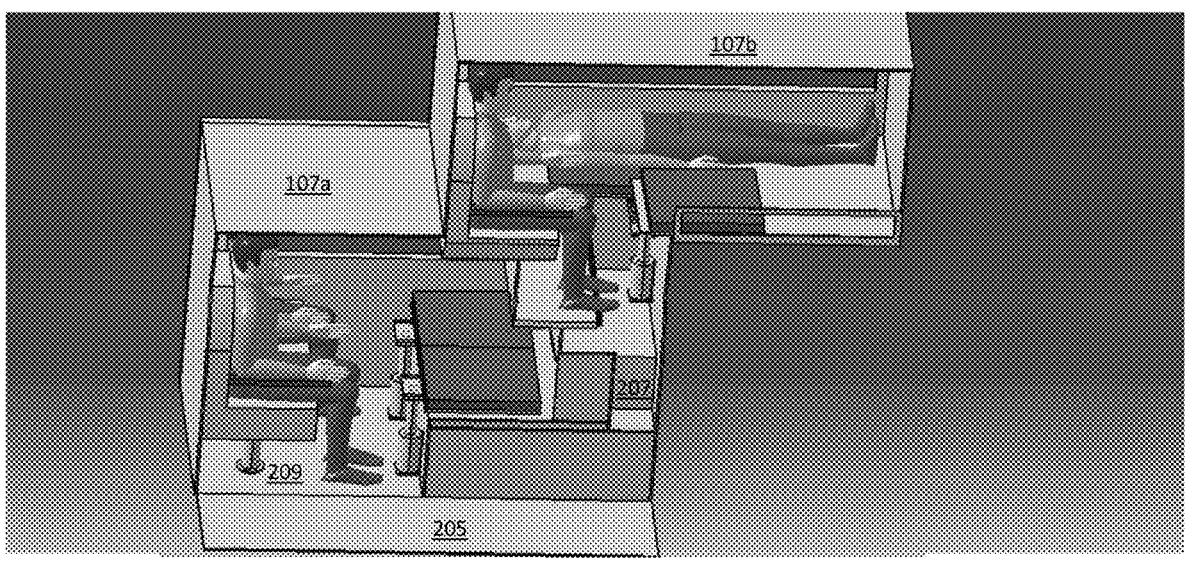
FIG. 2 illustrates a twin passenger cabin, according to an embodiment.

FIG. 2 illustrates a twin passenger cabin, according to an exemplary embodiment. The twin cabin can be installed on one side of the central hallway 205 while another twin cabin can be symmetrically installed across the twin cabin on the opposite side of the hallway 205. The twin cabin of FIG. 2 may consist of a lower cabin 107a and an upper cabin 107b. A cabin 107a or 107b may have two passenger capacity. In this embodiment, the cabins 107a and 107b may be open towards the hallway 205. The upper cabin 107b can be reached via stairway 207 from the hallway 205. The seats on lower cabin 107a may be designed as with one leg to provide more space under the seat shown as 209.

Figure 3:
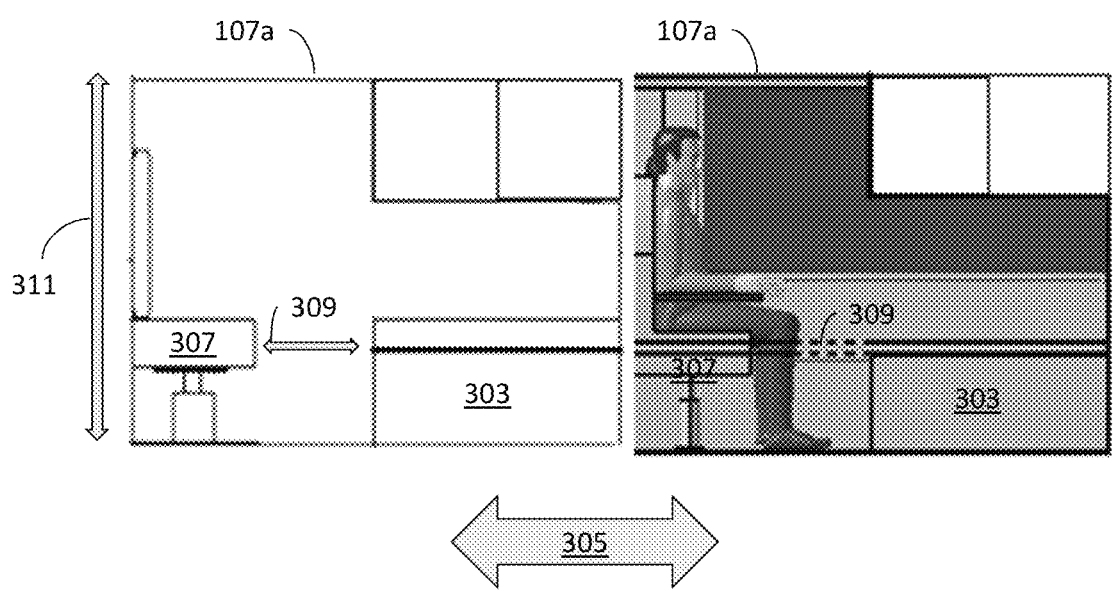
FIG. 3 illustrates inside of a passenger cabin, according to an embodiment.

FIG. 3 illustrates inside of a passenger cabin, according to an embodiment. The passenger cabin 107a can accommodate two passengers similar to connected seats in an ordinary bus. A hallow box 303 can be devised in front of two passengers. The box 303 may have a length of one meter along the hallway 305 and a one meter width along the width of cabin 107a. The box 303 can include a horizontal piece and a vertical piece. The horizontal piece can provide a lower half of a bed for the two passengers. The upper part of the passengers' bed can be provided by seat 307. As shown in FIG. 3, the horizontal piece of the box 303 and seat 307 may be in a sample plane may have equal height and provide 1.5 meters of the length of passenger's bed. The vertical piece of the box 303 may be positioned in a plane perpendicular to the plane of the horizontal piece. The opening 309 in front of seat 307 may have 50 centimeters width and may be filled with filling objects, discussed in more detail hereinafter, to provide a full two meters long bed for the passenger to lie down. The height 311 of cabin 107a can be 1.5 meters. The passenger can use the filling objects to convert the seat into bad or the bed into seat.

In some embodiments, the extra vertical space above the box 303 where the passenger's legs will rest, can be used for the upper cabin 107b shown in FIG. 2. For example, as shown in FIG. 2, the extra space above box 303 can be used for stairway 207 for reaching the upper cabin 107b and the foot space for cabin 107b.

Figure 4A:
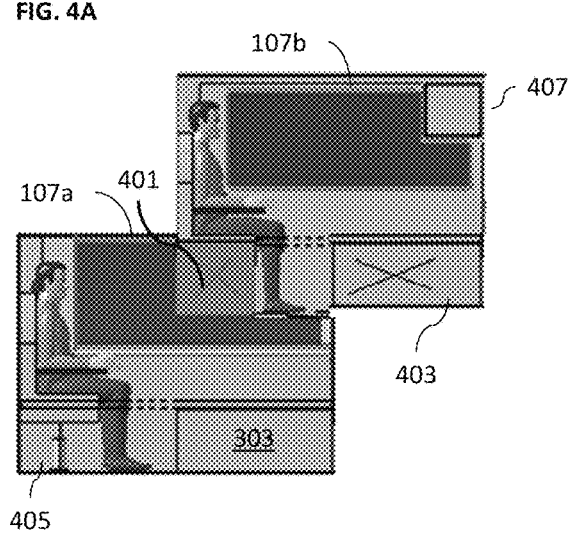
FIGS. 4A-4B illustrate arrangement of a twin cabin, according to one embodiment.
Figure 4B:
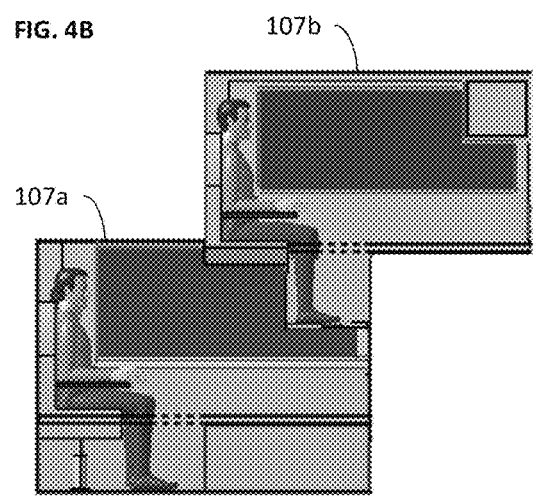

FIGS. 4A-4B illustrate arrangement of a twin cabin, according to one embodiment. The two passenger cabin of a twin set are fixed to each other similar to a three dimensional puzzle. As shown in FIG. 4A, the cabin 107b that is fixed above cabin 107a has a structure similar to cabin 107a. However, for better fitting of the two cabins 107a and 107b together, the box 403 shown in FIG. 4A can be removed from cabin 107b as shown in FIG. 4B such that cabin 107b can be fit on top of another lower cabin similar to cabin 107a from a neighbor twin cabin (not shown). In this case, the roof of the lower cabin of neighbor twin cabins can function as box 403 for cabin 107b as shown in FIG. 4B. In addition, the space 401 under the seat of cabin 107b may be similar to space 405 under the seat in cabin 107a as shown in FIG. 4A. However, the space 401 can be omitted from cabin 107b to provide an open space for cabin 107a as shown in FIG. 4B. FIG. 4B illustrates the twin cabins 107a and 107b with boxes 401 and 403 omitted. In FIG. 4B, the distance between the passenger of cabin 107a and the wall 409 behind the foot area of passenger 107b can be about 150 centimeters. This distance may provide a suitable distance for looking at a monitor. Therefore, a monitor may be installed on the wall 409 for watching a movie, for example. Similarly, the distance between passenger eye in cabin 107b and wall 411 can also be approximately 150 centimeters.

The upper cabin 107b can have a storage box 407 with or without shelves for the passengers to store their belongings. Inside the hollow box 303 can be used as storage space for the passengers in lower cabin 107a. The opening of box 303 can be either inside the cabin in front of passengers' feet or outside the cabin towards the hallway. A sliding plate can be devised under the seat of the upper cabin 107b to fix the upper and lower cabins together. In addition, thin sliding doors from light material can be devised in front of the cabin openings to close off the cabins from the hallway. The sliding doors can be fully closed or half closed. The seat in each cabin may have rails underneath such that the passenger can slide the seat forward in the direction towards box 303 and provide a small degree recline of the back of the seat from the vertical position.

Figure 5:
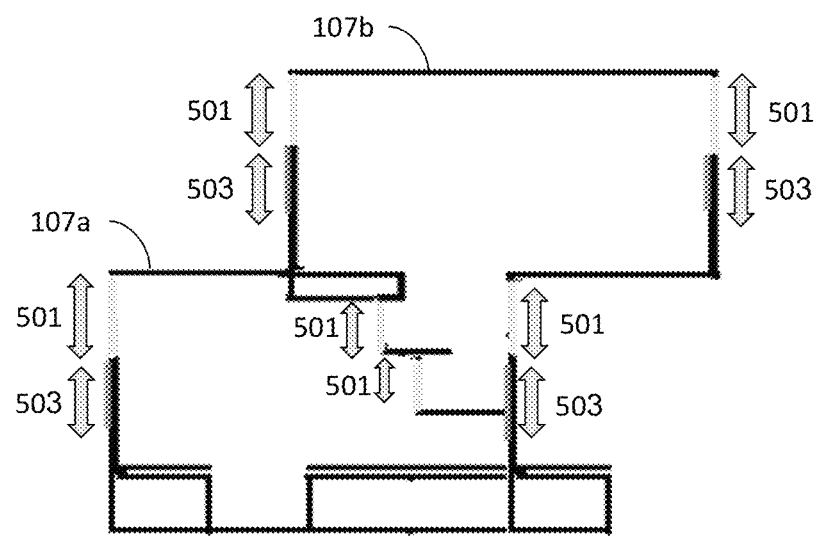
FIG. 5 illustrates glass fittings within the passenger cabins, according to an embodiment.

FIG. 5 illustrates glass fittings within the passenger cabins, according to an embodiment. The parts of cabins 107a and 107b walls marked with arrows 501 can be made of glass. The parts of cabins 107a and 107b walls marked with arrows 503 can be open areas. The open areas 503 may be also covered with glass or left open. The glass areas 501 and open areas 503 provide a view of the inside of the bus to the passengers sitting in cabins 107a and 107b.

Figure 6:
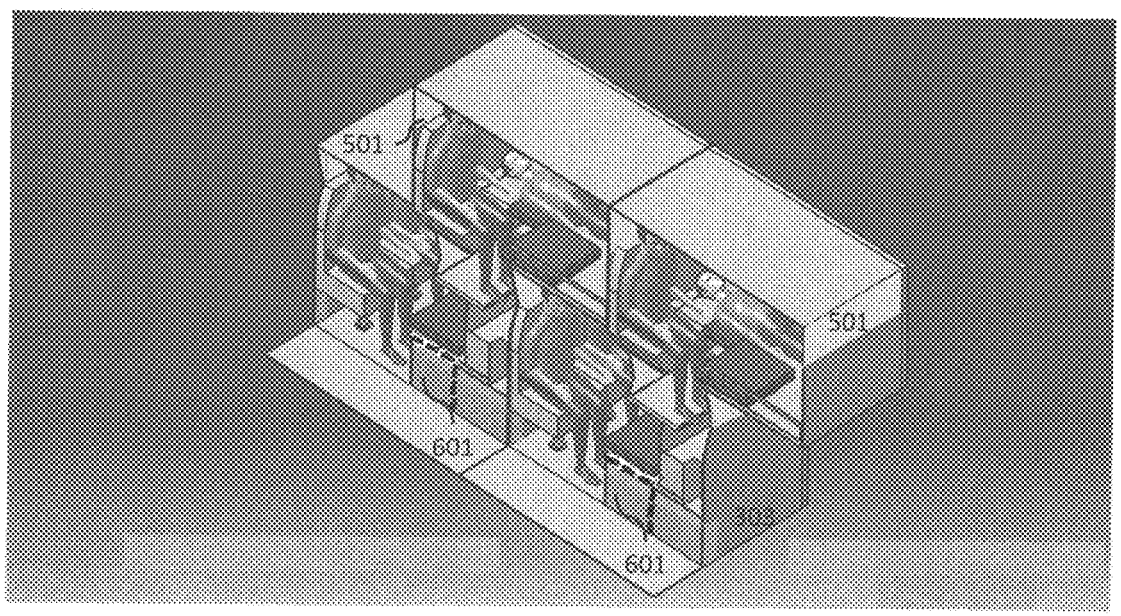
FIG. 6 illustrates a foot position within the passenger cabin, according to an embodiment.

FIG. 6 illustrates a foot position within the passenger cabin, according to an embodiment. In a sitting position, a person's feet rest on the floor with around 15 centimeters of vertical distance such that the right foot rests on the floor about 15 centimeters to the right and the left foot rests on the floor about 15 centimeters to the left. As shown in FIG. 6, a dent 601 can be devised within the box 303 such that the passenger can comfortably rest their feet inside the dent 601. The dent 601 can be devised on both sides of box 303 and for both passengers in the cabin. As discussed with regards to FIG. 5, portions 501 in FIG. 6 are glass parts that enable the passengers to have a total view of the bus inside.

Figure 7:
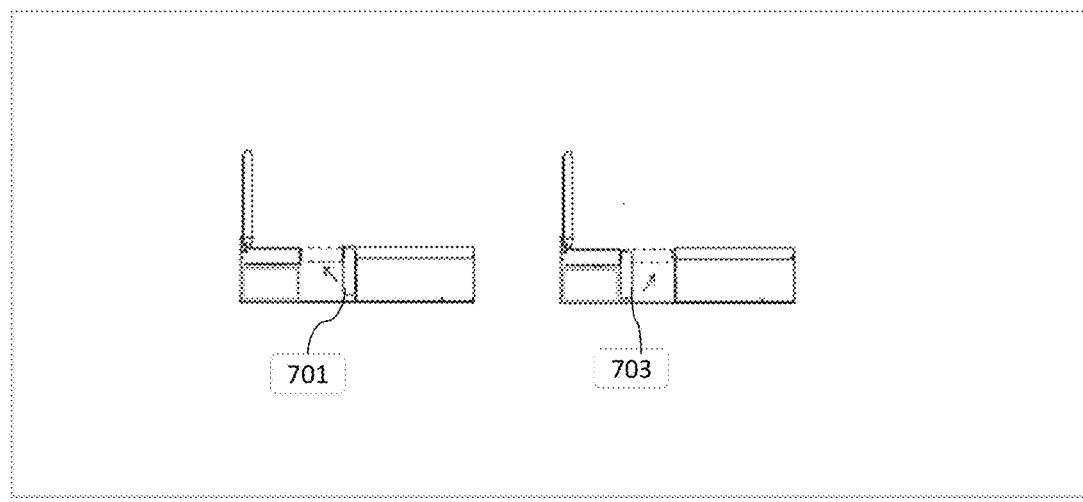
FIG. 7 illustrates a passenger seat with a foot rest, according to one embodiment.

FIG. 7 illustrates a passenger seat with a foot rest, according to one embodiment. A foot rest 701 or 703 shown in FIG. 1 is typically used in VIP buses, trains and airplanes. In one embodiment, a foot rest similar to foot rest 701 or 703 can be attached to a seat 307 (shown in FIG. 3) in a passenger cabin 107a, 107b, 109a or 109b. The foot rest 701 or 703 when brought to horizontal position, as illustrated in FIG. 7, can fill the gap 309 between the seat 307 and the box 303 of FIG. 3 to complete a bed for passenger rest. In other embodiments, a table with one leg and adjustable height can be provided for each passenger (not shown). The table, for example with 50 by 50 centimeters dimension on top, can be used by the passenger for writing, reading, dining, placing a laptop computer, etc. The table can also be adjusted by lowering the height to fill the gap 309 between the seat 307 and the box 303 of FIG. 3 to complete a bed for passenger rest. For example, the table leg may be equipped with an adjustable bar that can be extended to a table height and collapsed to a bed height. The table adjustment can be performed with press of a button.

Figure 8A:
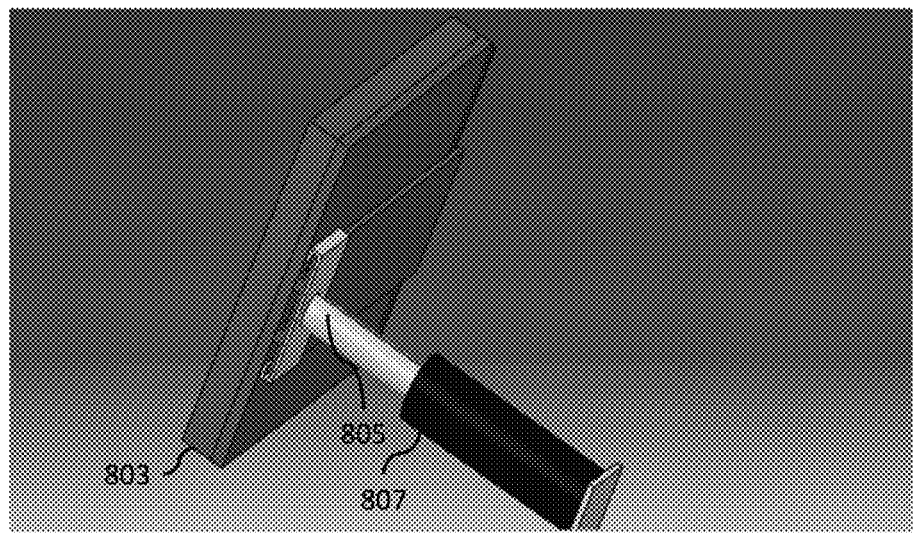
FIGS. 8A-8B illustrate sliding tables, according to one embodiment.
Figure 8B:
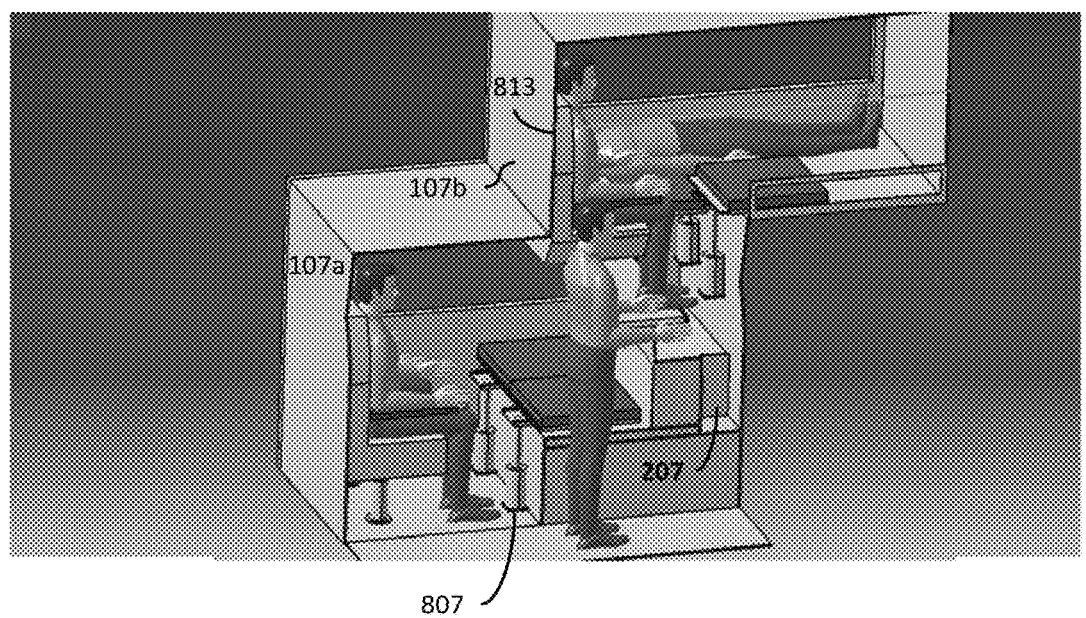

FIGS. 8A-8B illustrate sliding tables, according to one embodiment. FIG. 8A illustrates the railing under the sliding table 801. The railed shelf 803 can slide backward and forward in rail 805. As shown in FIG. 8B, when the passenger does not need table 801, the railed shelf 803 can be pushed forward inside the cabin by sliding the railed shelf 803 in rail 805. In such cases, only the single leg 807 of the table may remain in front of the passenger's feet. The line 813 in FIG. 8B illustrates the ceiling level in ordinary buses. As shown in FIG. 8B, part of the space from the lower cabin 107a is used for feet space of the upper cabin 107b and stairs 207 such that passenger can use for climbing into the upper cabin 107b.

Figure 9:
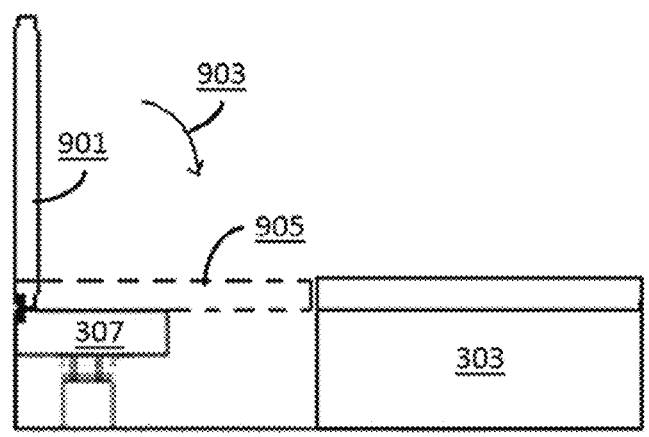
FIG. 9 illustrates a seat convertible to a bed, according to an embodiment.

FIG. 9 illustrates an exemplary method for converting a seat to a bed, according to an embodiment. In some cases, the bed is devised by forward reclining of the back of the passenger seat 307. For example, the back 901 of seat 307 can be reclined forward in the direction shown as 903. As a result, the back 901 of seat 307 can turn 90 degrees and be positioned in a horizontal direction shown as 905 at the same level of box 303 to provide a bed.

Figure 10:
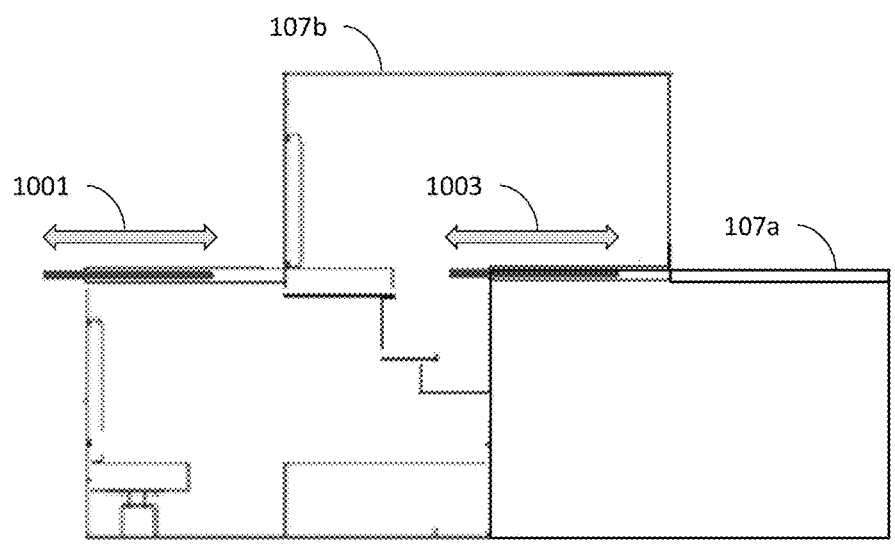
FIG. 10 illustrates a method for converting a passenger seat to bed, according to one embodiment.

FIG. 10 illustrates another exemplary method for converting a passenger seat to a bed, according to one embodiment. As shown in FIG. 10, the ceiling of a lower cabin 107a can be a double pane hollow ceiling with a thin sliding flat cushioned plate 1001 or 1003 hidden inside the double pane ceiling. The plate 1001 can slide out of the hollow ceiling and fill the gap 309 in an upper cabin 107b from the neighboring twin cabins to provide a bed for the cabin 107b of the neighboring upper cabin 107b. In some embodiments, a separate component can be devised for filling gap 309 and providing the bed. For example, the separate component may be a flat plate with cushioned surface that can be placed inside the cabin for the passenger to install it in place when needed.

Figure 11:
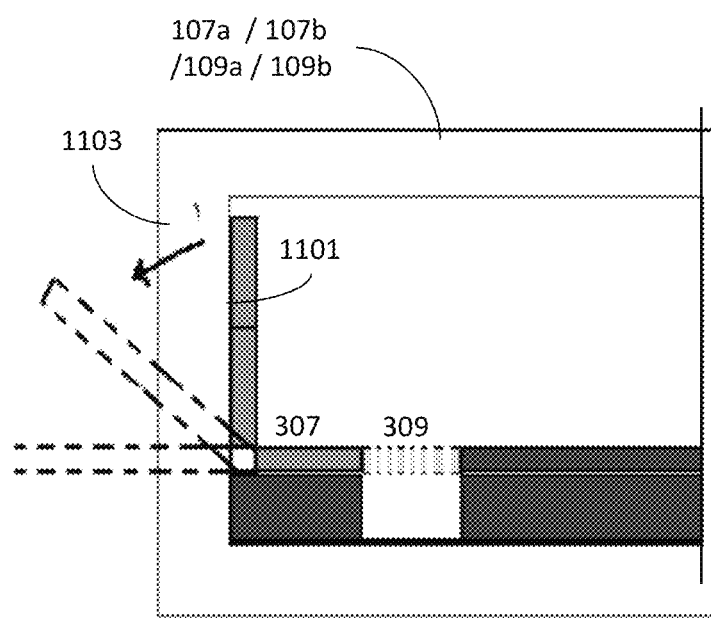
FIG. 11 illustrates a method for converting a passenger seat to bed, according to one embodiment.

FIG. 11 illustrates another exemplary method for converting a passenger seat to a bed, according to one embodiment. As shown in FIG. 11, the back 1101 of the seat inside a cabin 107a, 107b, 109a or 109b can recline backwards in the direction on arrow 1103 and at the same time the bottom 307 of the seat slide forward to fill the gap 309 and provide the bed. In such cases the back 1101 of seat may be made of two or more connected pieces such that the sliding of the back of the seat into the bottom of the seat can be performed smoothly. A piece of the back 1101 of seat 307 may remain upward in vertical position after the bed is completed. In some other instances, the box 303 may be a sliding box and can move toward the passenger seat by pulling such that the box 303 can fill the gap 309 (not shown). In such cases an extra piece can extend from the far end of the box 303 which can remain folded when the box 303 is separated from the seat in sitting position. Once the box 303 is pulled close to the seat, the extended part of box 303 can unfold and fill the gap created at the far end of the cabin cause by pulling the box.

Figure 12:
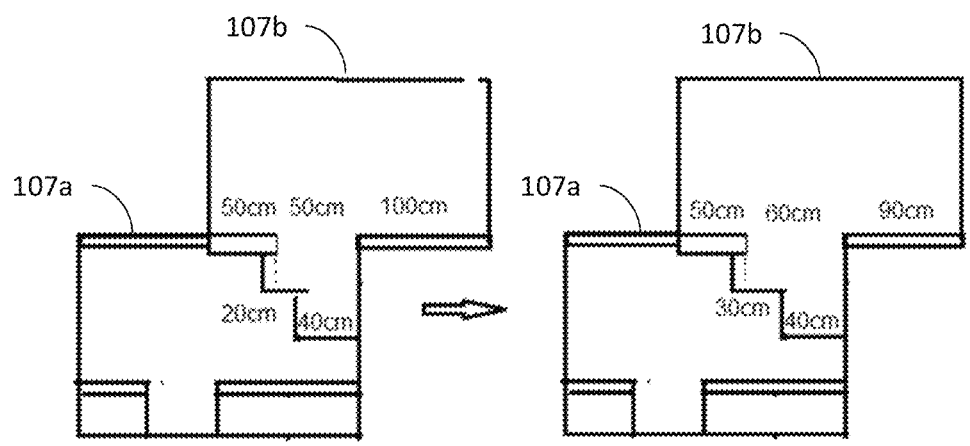
FIG. 12 illustrates how two twin cabins are attached together, according to an embodiment.

FIG. 12 illustrates two twin cabins being attached together, according to an embodiment. FIG. 12 also illustrates the exemplary dimensions and design of each cabin, as previously discussed with regards to FIGS. 1 to 11.

Figure 13:
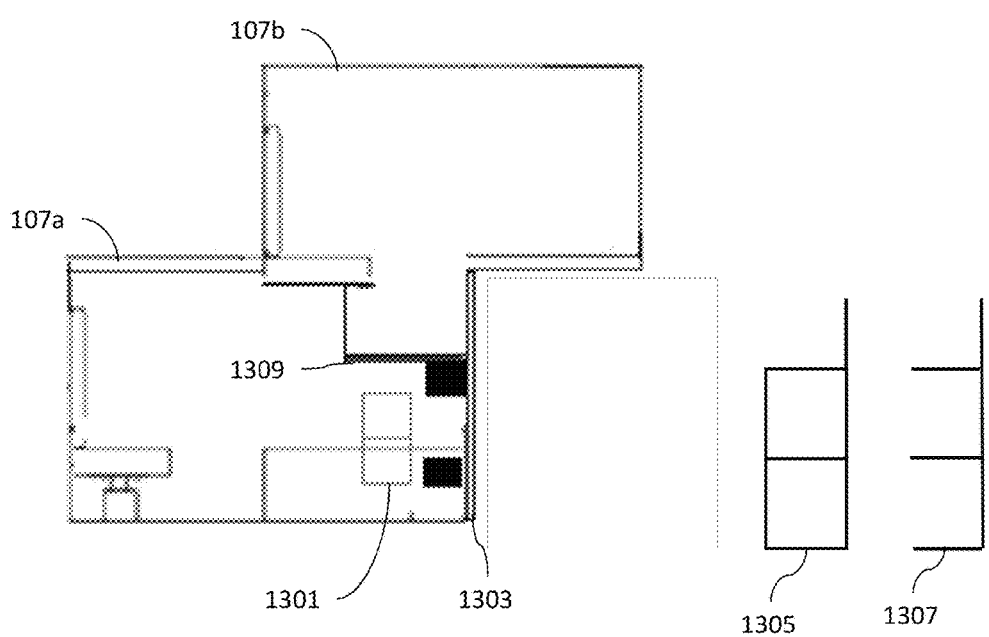
FIG. 13 illustrates stairs for an upper cabin, according to an embodiment.

FIG. 13 illustrates stairs for an upper cabin, according to an embodiment. As previously discussed with regards to FIG. 8B, a stairway 207 can be devised for a passenger to climb into the upper cabin 107b. As shown in FIG. 13, a ladder 1301 can replace the stairway 207. The ladder 1301 may have various shapes as shown by 1305 and 1307. The ladder 1301 may be attached to a sliding rail 1309 and can be hidden inside a slot 1303 provided in the cabin wall for holding the ladder.

Figure 14:
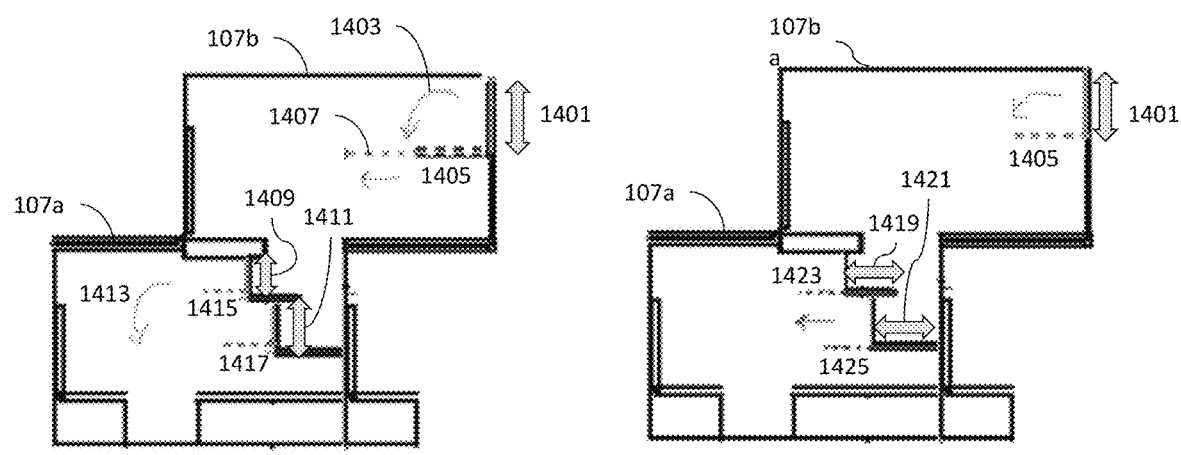
FIG. 14 illustrates storage shelves provided in passenger cabins, according to one embodiment.

FIG. 14 illustrates storage shelves provided in passenger cabins, according to one embodiment. Storage shelves may be made from clear or mate material, having one piece or multiple pieces, and having a raised edge or a flat edge. A storage shelf can be about one meter long and around 30 centimeters wide. In addition, the storage shelves can be fixed or folding shelves. For example, arrows 1409 and 1411 in FIG. 14 illustrate folding shelves in cabin 107a that when not in use can be folded up on the wall. The dotted lines 1415 and 1417 illustrate the horizontal position of shelves 1409 and 1411 respectively when in use. A shelf 1409 or 1411 can be pulled down in the direction of arrow 1413 to be prepared for use in positions 1415 or 1417. Similarly, shelf 1401 in cabin 107b is a folding shelf not in use. The shelf 1401 can be pulled down in the direction of arrow 1403 to sit at position 1405. In addition, the shelf 1405 may be manufactured in multiple pieces such as, for example, by pulling a sliding part of the shelf 1405, the shelf may expand in size to dotted line 1407 to provide a wide shelf for the passenger's use. For example, with safety arrangements applied, the wide shelf 1407 may be used as a sleeping area for a child.

In another embodiment, the shelf may be sliding shelves hidden under wall parts of a cabin when not in use. For example, as shown in FIG. 14, the shelves 1419 and 1421, when not in use, can be pushed under horizontal ceilings under the foot space and stairway of cabin 107b. When needed, the passenger of cabin 107a can pull the shelves 1419 and 1421 forward to the position shown with dotted lines 1423 and 1425 to be able to use them for storing personal items.

Figure 15:
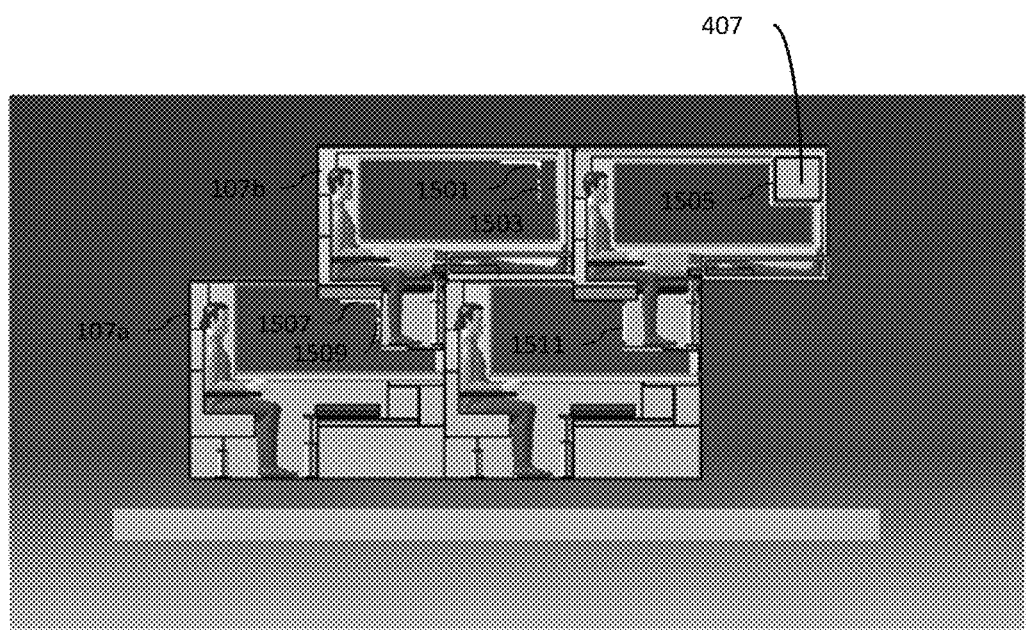
FIG. 15 illustrates monitor locations, according to various embodiments.

FIG. 15 illustrates monitor locations, according to various embodiments. A folding monitor 1501 can be installed in cabin 107b. The monitor 1501 can be pulled down to the vertical potion shown as dotted line 1503 such that the passenger in cabin 107b can watch videos. A monitor 1505 can be fixed to the back wall of the storage box 407. A folding monitor 1507 can be installed in cabin 107a under the passenger seat of cabin 107b. The monitor 1507 can be pulled down to the vertical potion shown as dotted line 1509 behind the foot location of cabin 107b such that the passenger in cabin 107a can watch videos. A monitor 1511 can be fixed to the back wall of the foot location of cabin 107b.

Figure 16A:
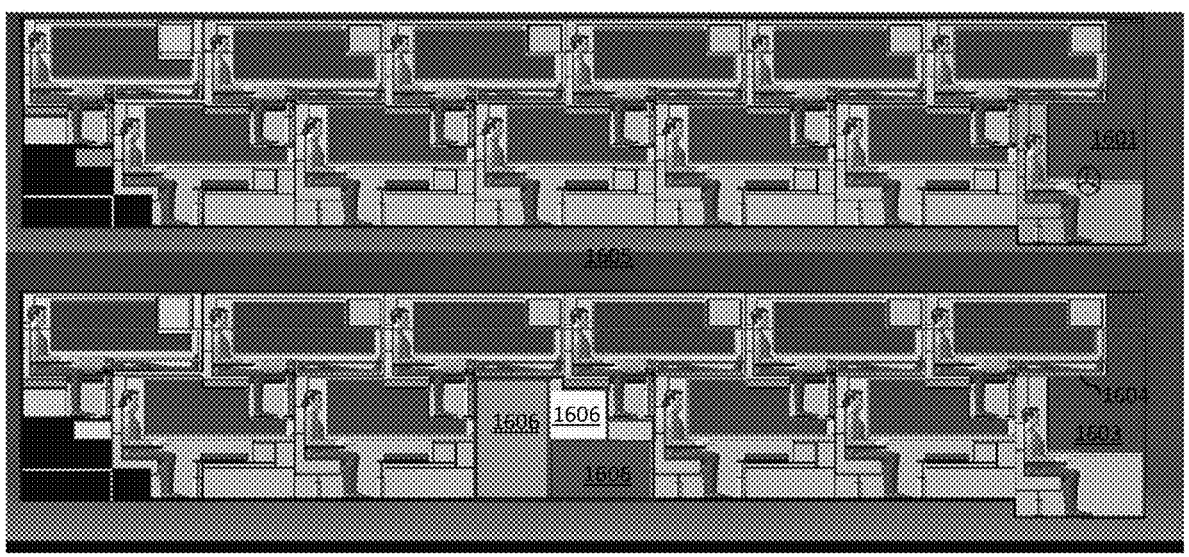
FIGS. 16A-16C illustrate arrangement of cabins in a bus compartment, according to an embodiment.
Figure 16B:
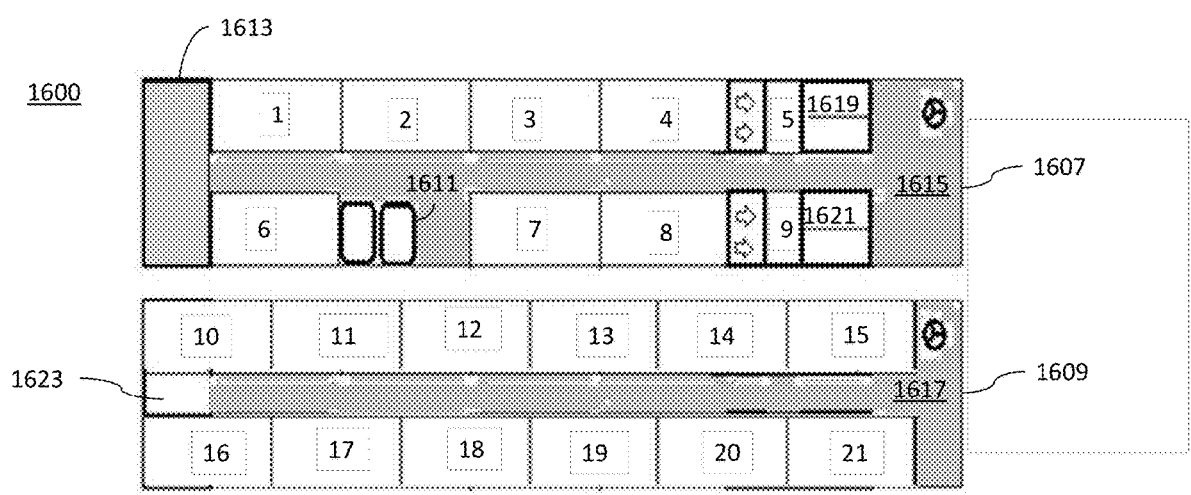
Figure 16C:
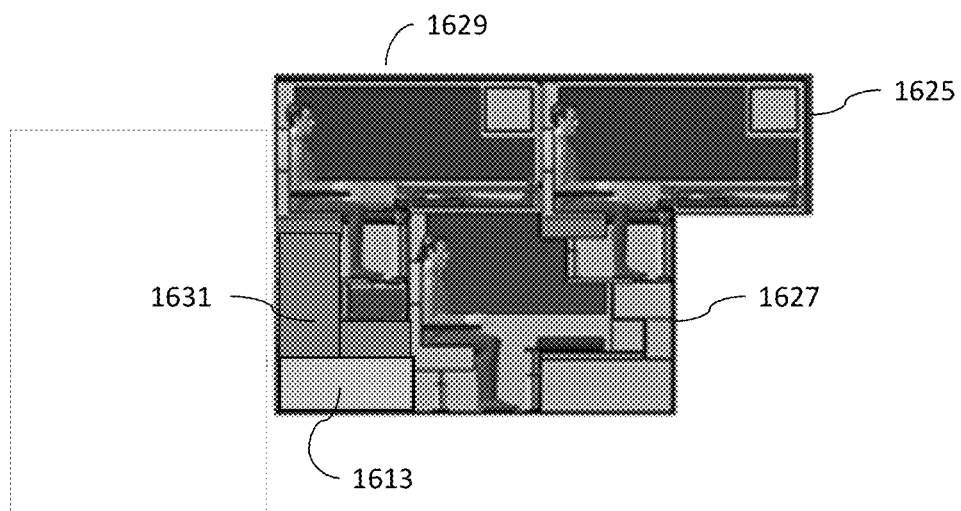

FIGS. 16A-16C illustrate arrangement of cabins in a bus compartment, according to an embodiment. As shown in FIG. 16A, the bus includes 11 cabins on the driver side 1601 behind the driver's seat and 10 cabins on the opposite side 1603 of the hallway 1605 behind the co-driver's seat. Each cabin may have two passenger capacity. Therefore, the total capacity of the bus in FIG. 16 may be 44 passengers. The areas shown as 1606 can be used for wash basin, water cooler, refrigerator, bathroom, etc. In addition, an area of the roof above co-driver's seat shown as 1604 can be a removable trap door such that when the upper cabin above the co-driver's seat is not in use, the trap door 1604 can be opened to provide more space above the co-driver's seat. Trap doors similar to trap door 1604 can be devised at other upper cabins as well.

FIG. 16B illustrates foundation of the bus of FIG. 16A for lower cabins 107a and upper cabins 107b. In FIG. 16B, 1607 designates arrangements of lower cabins 1 to 9 in the bus compartment and the foundation 1615 for lower cabins 1 to 9 (similar to lower cabins 107a). The bus compartment may have enough space for 10 lower cabins. However, space for one cabin has been dedicated to a back door and facilities such as refrigerator and storage or bathroom shown as 1615. In addition, an area 1613 is the engine bump where no lower cabins may be installed on. In FIG. 16B, 1609 designates arrangements of upper cabins 10 to 21 in the bus compartment and the foundation 1617 for upper cabins 10 to 21 (similar to lower cabins 107b).

The bus compartment may have enough space for 11 upper cabins. The space above the motor bump 1613 and the back door and storage 1615 can be used for upper cabins. In addition, upper cabins can extend above the driver seat 1619 and the co-driver seat 1621 and therefore number of upper cabins may be more than number of lower cabins. In addition, an extra space 1623 may be created between upper cabins 10 and 16 above the engine bump 1613. The extra space 1623 can be used for an additional passenger seat. The extra space 1623 may be divided between upper cabins 10 and 16 to provide wider seats and wider beds for the upper cabins 10 and 16.

FIG. 16C illustrates cabins in the first and last row of bus 1600. Cabin 1625 in FIG. 16C is a close view of cabin 15 or cabin 21 shown in FIG. 16B located above the driver's seat or co-driver's seat. Cabin 1629 of FIG. 16C is a close view of cabin 10 or cabin 16 of FIG. 16B located on top of engine bump 1613. Cabin 1627 in FIG. 16C is a close view of cabin 5 or cabin 9 in the first row of lower cabins right behind the driver's seat and co-driver's seats. In addition, the space 1631 remaining between the engine bump 1613 and the upper cabins 10 and 16 can be used as additional storage, a sleeping place, etc.

In some embodiments, the bus compartment as disclosed can be used for a VIP bus. In a VIP compartment, the twin cabins with two passenger capacity for each cabin can be devised on one side of the hallway, while the other side of the hallway may be devised with twin cabins each having one passenger capacity. In the VIP arrangement, each passenger seat can be 10 to 15 centimeters wider than the full capacity model previously discussed. Today, common VIP busses may have 22 to 24 passenger capacity. In such conditions each seat can have a width of 90 centimeters and the central hallway can be 70 centimeters wide.

In some instances, the current bus compartments can be converted to devise the cabins as disclosed. In a converted bus, height of the compartment may be 2 to 2.25 meters. The passenger compartment as disclosed can be used in trains and airplanes. For example, a portion of the train compartments can be arranged based on the disclosed compartments. The hallway can be devised either in the center or on one side of the train compartment.

Figure 17:
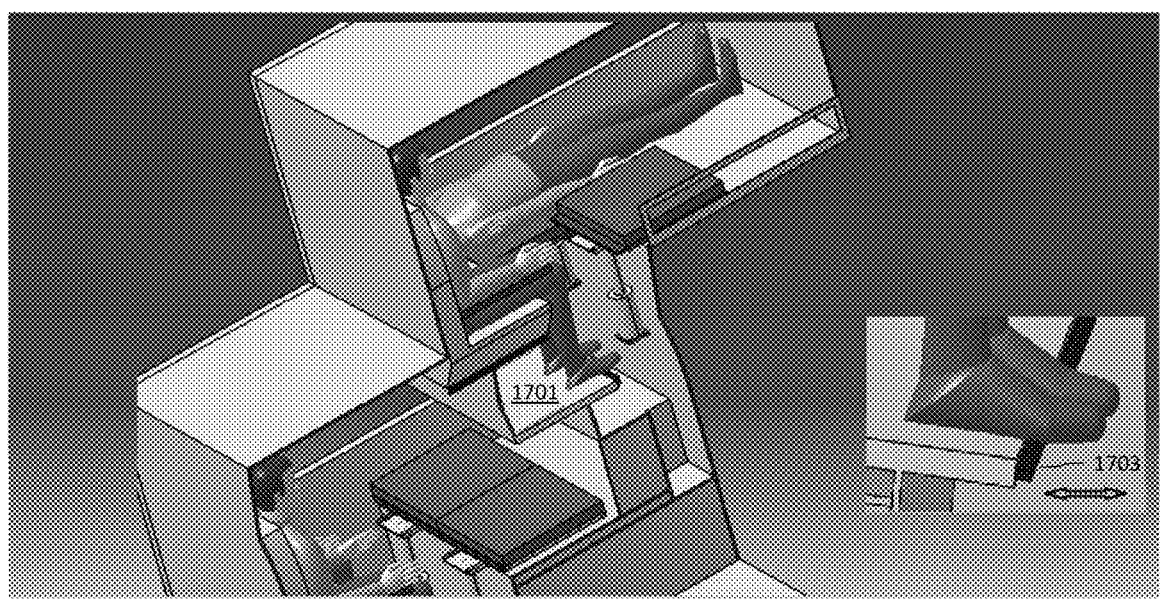
FIG. 17 illustrates a view of the passenger cabin, according to an embodiment.

FIG. 17 illustrates a view of the passenger cabin, according to an embodiment. FIG. 17 illustrates the floor of the upper cabin from twin cabins. The floor board 1701 can have a horizontally extendable part 1703 that can be extended in the direction shown by an arrow. The passenger can pull the extension piece out to provide a foot rest. In some instances, the floor board 1701 can be made in one piece. However, having the extension 1703 provides the advantage of facilitating entering and exiting and standing upright. There can also be a vertical surface under the seats which can be extended forward or downward.

Figure 18:
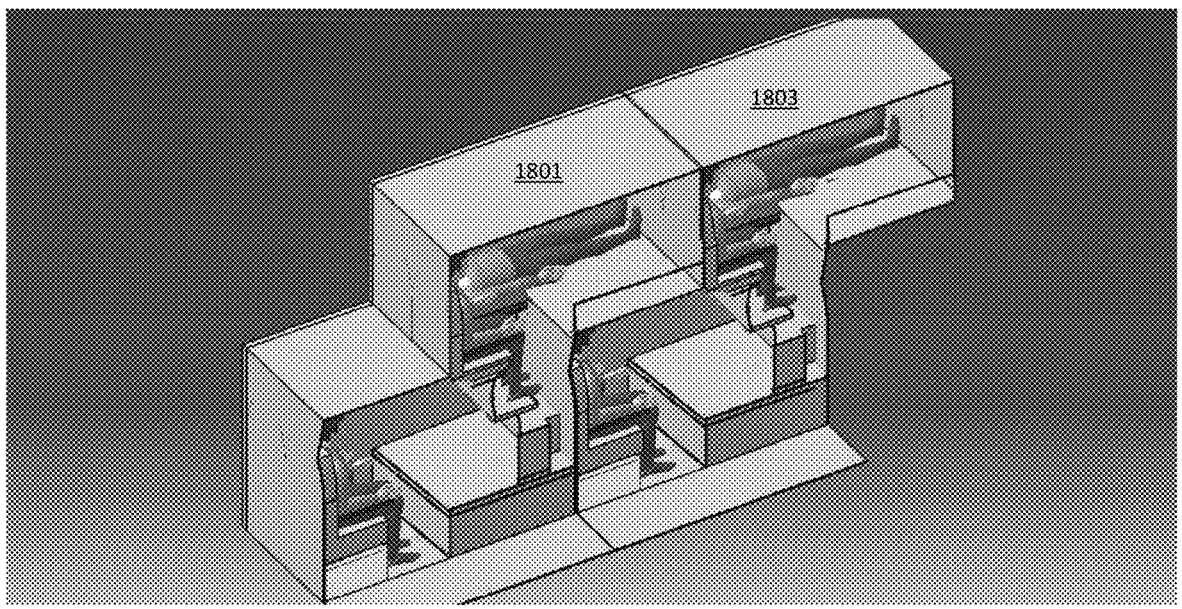
FIG. 18 illustrates a view of the passenger cabin with the front box removed, according to an embodiment.

FIG. 18 illustrates a view of the passenger cabin with the front box removed, according to an embodiment. FIG. 18 illustrates two twin cabins 1801 and 1803 located on same side of the central isle. In FIG. 18 there are no fillers in front of passengers' feet. In the model of FIG. 18, the passenger seats can be on rails and can move forward and backward using the rails.

Figure 19:
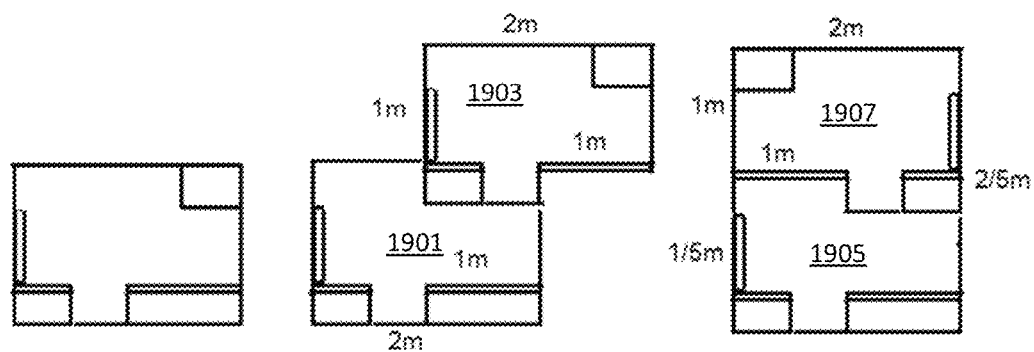
FIG. 19 illustrates different arrangements of twin cabins, according to various embodiments.

FIG. 19 illustrates different arrangements of twin cabins, according to various embodiments. FIG. 19 illustrates two different arrangements of twin cabins. For example cabins 1901 and 1903 are located on top of each other with cabin 1903 being shifted forward, while cabins 1905 and 1907 are located on top of each other without a shifting.

Figure 20:
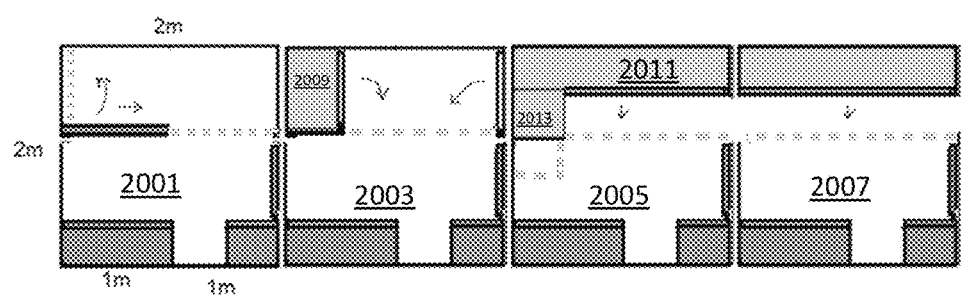
FIG. 20 illustrates a VIP cabin, according to an embodiment.

FIG. 20 illustrates a VIP cabin, according to an embodiment. FIG. 20 illustrates VIP cabins derived from the original cabins previously discussed. Each room 2001, 2003, 2005, and 2007 can accommodate two passengers. The seats and the boxes in front of each seat are similar to the original design as previously discussed. However, at the resting time one passenger can lie down on the bed in the lower part of the cabin while another passenger can lie down on the bed in the upper part of the cabin.

Cabins 2001 to 2007 illustrates four different bed arrangements. In cabin 2001, the upper bed can be folded upward or downward, as shown by arrows, using vertical rails. In Cabin 2003, there is a nook 2009 to facilitate entering and exiting from the upper bed. In cabin 2005, there is a folding bed 2011 with a fixed section 2013. In a cabin 2007, a half of the upper bed is fixed and another half of the upper bed can be sliding below or above the fixed half and can be opened by sliding forward. The total packages can twitch to an upright position.

Figure 21:
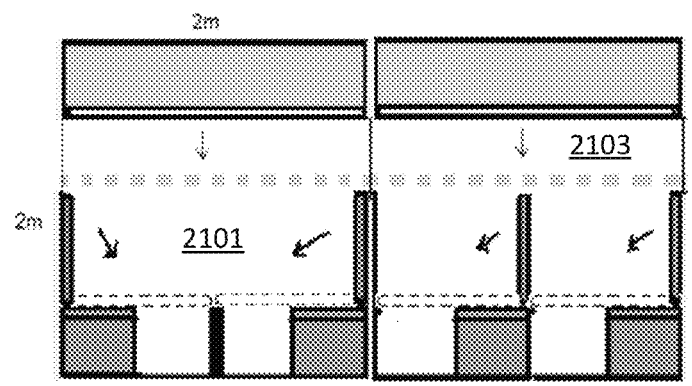
FIG. 21 illustrates a cabin design derived from the main design, according to an embodiment.

FIG. 21 illustrates a cabin design derived from the main design, according to an embodiment. The cabins illustrated in FIG. 21 can be a combination of full cabin and a VIP cabin. In cabins 2101 and 2103 there is an upper bed close to the ceiling with vertical rails. In addition, there is a lower bed with a filler. Specifically, in some models, at the resting time, the back of seats can be folded down to increase the bed length. These two types of fillers are useful for buses with 12 cabins.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A twin passenger compartment for a commercial vehicle comprising:
    a first cabin including a first seat for a first passenger, a first podium placed in front of the first seat and configured to provide a resting space for the first passenger's feet when the first passenger is in a sleeping position, and a first empty space placed between the first podium and the first seat configured to provide a resting space for the first passenger's feet when the first passenger is in a seating position;
    a second cabin installed on a roof of the first cabin such that the second cabin is accessible from the first cabin and is shifted toward front end of the first cabin as much as approximately half length of the first cabin, the second cabin includes a second seat for a second passenger, a second podium placed in front of the second seat and configured to provide a resting space for the second passenger's feet when the second passenger is in a sleeping position, and a second empty space placed between the second podium and the second seat configured to provide a resting space for the second passenger's feet when the second passenger is in a seating position;
    a first filling element configured to be placed between the first seat and the first podium to connect the first seat to the first podium and provide a first bed rest area in the first cabin; and
    a second filling element configured to be placed between the second seat and the second podium to connect the second seat to the second podium and provide a second bed rest area in the second cabin, wherein:
    the first cabin includes a recess located above the first seat, the recess extends inwardly from an outside edge of the first seat toward an inside of the first cabin for approximately 10 to 15 centimeters to provide an extra space for a torso of a passenger walking in a hallway of the commercial vehicle, and
    the second seat rests on the roof of the first cabin such that substantially an entire area under the second seat falls within an interior space of the first cabin.

2. The twin passenger compartment for the commercial vehicle of claim 1, wherein:

each of the first and second cabins are approximately two meters long, one meter wide and one and half meters high, the twin passenger compartment is approximately three meters long, one meter wide and between two to two and half meters high, and a distance between the first seat with a first cabin wall located in front of the first seat is approximately 150 centimeters, and a distance between the second seat with a second cabin wall located in front of the second seat is approximately 150 centimeters.

3. The twin passenger compartment for the commercial vehicle of claim 2, wherein:

the first seat includes a first horizontal portion configured to provide a resting place for a bottom of the first passenger, a first vertical portion configured to provide a resting place for a back of the first passenger, the second seat includes a second horizontal portion configured to provide a resting place for a bottom of the second passenger, a second vertical portion configured to provide a resting place for back of the second passenger, the first horizontal portion is configured as movable to a forward position at which the first horizontal portion fills the first empty space, and the second horizontal portion is configured as movable to a forward position at which the second horizontal portion fills the second empty space.

4. The twin passenger compartment for the commercial vehicle of claim 3, wherein:

the first vertical portion is configured to move forward as the first horizontal portion moves forward to replace an original position of the first horizontal portion prior to moving forward, and the second vertical portion is configured to move forward as the second horizontal portion moves forward to replace an original position of the second horizontal portion prior to moving forward.

5. The twin passenger compartment for the commercial vehicle of claim 3, wherein:

the first vertical portion is configured to remain stationary as the first horizontal portion moves forward, and the second vertical portion is configured to remain stationary as the second horizontal portion moves forward.

6. The twin passenger compartment for the commercial vehicle of claim 1, wherein:

the first podium is configured to extend outwardly to fill in the first empty space and turn the first cabin to a bed, and the second podium is configured to extend outwardly to fill in the second empty space and turn the second cabin to a bed.

7. The twin passenger compartment for the commercial vehicle of claim 1, wherein a lower part of the second cabin merges into an upper part of the first cabin such that a total of the twin cabin is between approximately two to two and half meters high.

8. The twin passenger compartment for the commercial vehicle of claim 7, wherein:

a space under the first podium is provided for additional leg room in the first cabin, and a space under the second podium is provided for additional leg room in the second cabin.

9. The twin passenger compartment for the commercial vehicle of claim 8, wherein:

the first and second empty spaces are each approximately 50 centimeters long, and the first and second podiums are each approximately one meter long and one meter wide, with a height substantially equal to a height of their respective seats.

10. The twin passenger compartment for the commercial vehicle of claim 9, wherein:

the first filler filling element is a first table configured to move between a first position and a second position, wherein at the second position the first table is configured to be placed between the first seat and the first podium to connect the first seat to the first podium and provide the first bed rest area in the first cabin, and the second filling element is a second table configured to move between a first position and a second position, wherein at the second position the second table is configured to be placed between the second seat and the second podium to connect the second seat to the second podium and provide the second bed rest area in the second cabin.

11. The twin passenger compartment for the commercial vehicle of claim 8, wherein:

the first filling element is further configured to form a first backing portion of the first seat, and the second filling element is further configured to form a second backing portion of the second seat.

12. The twin passenger compartment for the commercial vehicle of claim 1, wherein:

the first podium includes a first railed shelf configured to slide over the first podium, when pulled by the first passenger, slide over the first empty space and become the first filling element for filling the first empty space, and the second podium includes a second railed shelf configured to slide over the second podium, when pulled by the second passenger, slide over the second empty space and become the second filling element for filling the second empty space.

13. The twin passenger compartment for the commercial vehicle of claim 1, wherein:

the first and second cabins are configured to include a storage for storing the first and second filling elements respectively.

14. The twin passenger compartment for the commercial vehicle of claim 1, wherein:

the first passenger seat includes a two piece seat back, wherein the first passenger seat slides forward to function as the first filling element for filling the first empty space and completing the first bed area while the seat back reclines backwards and a lower piece of the seat back provides a top part of the first bed area, and the second passenger seat includes a two piece seat back, wherein the second passenger seat slides forward to function as the second filling element for filling the second empty space and completing the second bed area while the seat back reclines backwards and a lower piece of the seat back provides a top part of the second bed area.

15. The twin passenger compartment for the commercial vehicle of claim 1, wherein:

the first podium includes a horizontal piece and a vertical piece, the horizontal piece being in a same plane as the first seat and configured to move forward to function as the first filling element and the vertical piece being a plane perpendicular to the plane of the first seat and configured to move forward along with the horizontal piece to fill a space created at an end of the first cabin when the horizontal piece is moved forward by the first passenger, thereby becoming in the same plane as the first seat, and the second podium includes a horizontal piece and a vertical piece, the horizontal piece being in a same plane as the second seat and configured to move forward to function as the second filling element and the vertical piece being a plane perpendicular to the plane of the second seat and configured to move forward along with the horizontal piece to fill a space created at an end of the second cabin when the horizontal piece is moved forward by the second passenger, thereby becoming in the same plane as the first seat.

16. The twin passenger compartment for the commercial vehicle of claim 1, wherein each of the first cabin and the second cabin includes two passenger capacity.

17. The twin passenger compartment for the commercial vehicle of claim 1, wherein each of the first cabin and the second cabin has a display monitor.

18. The twin passenger compartment for the commercial vehicle of claim 1, wherein the second cabin is accessed via a stairway or a ladder placed inside the first cabin.

19. The twin passenger compartment for the commercial vehicle of claim 1, wherein the commercial vehicle includes a bus and the bus includes a plurality of the two passenger compartments.

20. The twin passenger compartment for the commercial vehicle of claim 18, wherein the bus includes at least five twin passenger compartments on a driver's side and at least five twin passenger compartments on a co-driver's side.

21. The twin passenger compartment for the commercial vehicle of claim 19, wherein:

a hallway is located between the twin passenger compartments on the driver's side and the twin passenger compartments on the co-driver's side, a width of the hallway is configured such that the width is wider at a shoulder length of a person walking in the hallway and narrower at above and below the shoulder length, the narrower hallway adds to a width of the plurality of twin cabins on two sides of the hallway.

* * * * *